United States Patent
Luo

(10) Patent No.: US 9,428,166 B2
(45) Date of Patent: Aug. 30, 2016

(54) MASTER CYLINDER ASSEMBLY IN BRAKE SYSTEM AND PISTON STOP

(71) Applicant: Dongqiang Luo, Shanghai (CN)

(72) Inventor: Dongqiang Luo, Shanghai (CN)

(73) Assignee: BWI (Shanghai) Co. Ltd., Shanghai (CN)

( * ) Notice: Subject to any disclaimer, the term of this patent is extended or adjusted under 35 U.S.C. 154(b) by 366 days.

(21) Appl. No.: 14/032,353

(22) Filed: Sep. 20, 2013

(65) Prior Publication Data

US 2014/0305120 A1    Oct. 16, 2014

(30) Foreign Application Priority Data

Apr. 16, 2013   (CN) .......................... 2013 1 0140709

(51) Int. Cl.
| | | |
|---|---|---|
| *F16B 2/06* | (2006.01) | |
| *F16B 5/06* | (2006.01) | |
| *B60T 11/16* | (2006.01) | |
| *B60T 11/20* | (2006.01) | |

(52) U.S. Cl.
CPC .............. *B60T 11/165* (2013.01); *B60T 11/20* (2013.01)

(58) Field of Classification Search
CPC ......... F16F 1/128; F16F 9/0454; F15B 7/08; B60T 11/16; B60T 11/165; B60T 11/20; B60G 11/28; F16B 5/0657; F16B 5/0664
USPC .......................................... 60/533; 192/66.1
See application file for complete search history.

(56) References Cited

U.S. PATENT DOCUMENTS

| | | | | |
|---|---|---|---|---|
| 4,856,282 A | * | 8/1989 | Leigh-Monstevens | . B60T 11/16 60/589 |
| 5,342,139 A | * | 8/1994 | Hoffman | B60G 7/001 267/219 |
| 6,827,379 B2 | * | 12/2004 | Hill | A47F 5/0006 248/205.3 |
| 7,287,457 B1 | * | 10/2007 | Gualdoni | F15B 15/261 60/589 |
| 8,088,081 B2 | * | 1/2012 | Field | A61B 10/02 600/567 |
| 9,127,701 B2 | * | 9/2015 | Tung | F16B 2/065 |
| 2006/0284355 A1 | | 12/2006 | Miyahara et al. | |

(Continued)

FOREIGN PATENT DOCUMENTS

| | | |
|---|---|---|
| CN | 101594896 A | 12/2009 |
| DE | 3326410 A1 | 3/1984 |

(Continued)

OTHER PUBLICATIONS

Search Report; State Intellectual Property Office of China, Dated Feb. 3, 2016, 4 Pages.
Office Action, State Intellectual Property Office of China, Dated Feb. 3, 2016, 8 Pages.

*Primary Examiner* — Nathaniel Wiehe
*Assistant Examiner* — Richard Drake
(74) *Attorney, Agent, or Firm* — Dickinson Wright PLLC

(57) ABSTRACT

The present invention relates to a master cylinder assembly in a brake system and a piston stop. The master cylinder assembly comprises one or more piston assemblies. At least one of the piston assemblies comprises a piston (1), a piston stop (2) and a spring (3), wherein the piston stop (2) snaps into the piston (1), and the spring is retained between the piston (1) and the piston stop (2) and placed outside the piston stop (2). According to the present invention, on a circumferential wall of the piston stop (2) are provided deep slots (4) extending axially and running through the thickness of the circumferential wall, and these deep slots open towards one side of the piston stop where it snaps into the piston (1).

14 Claims, 3 Drawing Sheets

(56) References Cited

U.S. PATENT DOCUMENTS

| | | | |
|---|---|---|---|
| 2008/0281226 A1* | 11/2008 | Peters | A61B 10/02 600/567 |
| 2009/0212621 A1 | 8/2009 | Drott et al. | |
| 2009/0280033 A1* | 11/2009 | Cote | B01L 3/0279 422/400 |
| 2012/0197213 A1* | 8/2012 | Kohlbrenner | A61M 5/20 604/220 |
| 2014/0350484 A1 | 11/2014 | Kohlbrenner et al. | |

FOREIGN PATENT DOCUMENTS

| | | |
|---|---|---|
| DE | 102006013626 A1 | 10/2006 |
| EP | 1595303 A2 | 11/2005 |
| GB | 2126295 A | 3/1984 |
| JP | 2006015801 A | 1/2006 |
| WO | 2012079839 A1 | 6/2012 |

\* cited by examiner

180
MASTER CYLINDER ASSEMBLY IN BRAKE SYSTEM AND PISTON STOP

CROSS REFERENCE TO RELATED APPLICATION

This application claims the benefit of application CN201310140709.7 filed Apr. 16, 2013 which is hereby incorporated by reference as though set forth fully herein.

FIELD OF THE INVENTION

The present invention relates to a master cylinder assembly in a brake system, comprising one or more piston assemblies, wherein the piston assembly comprises a piston, a piston stop and a spring, the piston stop snaps into the piston, and the spring is retained between the piston and the piston stop and disposed outside the piston stop.

Besides, the present invention further relates to a piston stop for a master cylinder assembly in a brake system.

BACKGROUND OF THE INVENTION

In the prior art a brake master cylinder is known, which comprises two piston assemblies with substantially identical structure, namely, a primary piston assembly and a secondary piston assembly. Each piston assembly comprises a piston, a piston stop and a spring acting between the piston and the piston stop. Usually, the piston stop is assembled on the piston by means of threaded connection or riveting. Therefore, some extra parts such as a screw, a pin, a spring seat or the like are needed when the brake master cylinder is assembled. Such brake master cylinder is structurally complicated and has many parts. In most cases, each piston assembly of the brake master cylinder needs 4-5 parts. Such a complicated structure causes the manufacturing cost and assembling cost of the brake master cylinder very high.

A piston-type brake master cylinder for a vehicle is known from the patent document ZL200820186125.8 and comprises a master cylinder block, a first piston and a second piston, wherein a spring is disposed in an inner cavity of a piston stop, namely, disposed in the piston stop. However, if a size of a bore for forming the inner cavity is too small, an enough mounting space cannot be provided for the spring, so the spring cannot be encapsulated in the piston stop. In addition, the clearance between an outer diameter of the spring and an inner diameter of the piston stop is very small, the outer-diameter portion of the spring might contact the inner-diameter portion of the piston stop, namely, it might cause plastic to spring contact that could produce plastic debris and thereby affect sealing effect of a sealing member and cause hydraulic leakage. Therefore, the assembling of the spring is limited by the bore diameter of the piston stop, and the spring cannot be applied to a brake master cylinder assembly with a small bore diameter.

In addition, a piston stop sleeved around a positioning pin at a center of the piston is known from the prior art. Although there are a plurality of elongate holes on a circumferential wall of the piston stop, the bottom portion of the piston stop is a closed circumferential portion and it cannot open and deform when the piston stop snaps into the piston. Therefore, the piston stop almost cannot be installed. Even if it is installed forcedly, the piston stop scratches with the piston and thereby produces debris due to too tight contact between the piston stop and the piston upon assembling, thereby affecting the sealing action of the sealing member. Besides, the piston stop might break duo to forced assembling.

SUMMARY OF THE INVENTION

An object of the present invention is to provide an improved master cylinder assembly in a brake system and a piston stop. The master cylinder assembly and piston stop provided by the present invention can overcome drawbacks in the prior art, they have less parts and can be simply assembled with a safe and reliable performance. Upon assembling the master cylinder assembly, the piston stop may be easily assembled on the piston, thereby avoiding production of debris caused by scratching due to contact between the piston stop and the piston and avoiding unfavorable influence on the sealing effect of the sealing member.

The above object is achieved by the following technical solution: a master cylinder assembly in a brake system comprises one or more piston assemblies, at least one of the piston assemblies comprises a piston, a piston stop and a spring, wherein the piston stop snaps into the piston, and the spring is retained between the piston and the piston stop and placed outside the piston stop. According to the present invention, on a circumferential wall of the piston stop are provided deep slots extending axially and running through the thickness of the circumferential wall, and these deep slots open towards one side of the piston stop where it snaps into the piston. By means of the deep slots, elasticity of the piston stop can by improved so that the piston stop can be easily assembled on the piston.

In a preferred embodiment of the present invention, holes are provided on a circumferential wall of the piston stop. The design promotes circulation of a brake liquid during braking operation so that the brake fluid circulates to an outlet quickly, and facilitates making a braking response quickly. Preferably, the holes are symmetrically arranged about a central axis of the piston stop.

In another preferred embodiment of the present invention, a flange is provided at an end of the piston stop away from the piston. On a bottom surface of the flange are provided radially extending grooves. The design promotes circulation of a brake liquid to an outlet during braking operation, and facilitates making a braking response quickly. Preferably, the grooves are symmetrically arranged about a central axis of the piston stop.

In a further preferred embodiment of the present invention, on the flange of the piston stop is provided a flat surface for supporting one end of the spring.

In another preferred embodiment of the present invention, a cavity is provided in the piston, a pin-shaped protrusion is provided at a center of the cavity and it may snap in the piston stop and cooperate with the piston stop. A master cylinder assembly which has a compact structure and a small need for space and can be assembled simply can be achieved by means of such design. In a further preferred embodiment of the present invention, an "R"-shaped lead is provided at an end of the pin-shaped protrusion where it snaps into the piston stop. The "R"-shaped lead makes the assembling easier and avoids production of debris caused by contact between the piston stop and the piston when the piston stop is assembled on the piston.

In a further preferred embodiment of the present invention, an "R"-shaped lead may be provided at an end of the piston stop where it snaps into the piston. Preferably, a reinforcing rib is axially provided on a circumferential inner wall of the piston stop closely adjacent to the "R"-shaped lead of the piston stop. Preferably, the reinforcing ribs are arranged symmetrically about an axis of the piston stop. The reinforcing ribs may reinforce the strength of the end of the piston stop where it snaps into the piston, particularly when the piston stop snaps into the piston.

In a further preferred embodiment of the present invention, on the piston is provided a flat surface for supporting one end of the spring. Preferably, on a bottom portion of a cavity of the piston is provided a flat surface for supporting one end of the spring.

In a further preferred embodiment of the present invention, deep slots are symmetrically arranged about an axis of the piston stop. By means of such design, the piston stop can be more easily assembled on the piston.

In a further preferred embodiment of the present invention, the piston stop is made of plastic, and it is easy to process and can be manufactured with a lower cost.

Besides, the present invention further provides a piston stop of a master cylinder assembly in a brake system. The master cylinder assembly comprises one or more piston assemblies, and at least one of the piston assemblies comprises a piston, a piston stop and a spring, wherein the piston stop snaps into the piston of the master cylinder assembly. According to the present invention, on a circumferential wall of the piston stop are provided deep slots extending axially and running through a thickness of the circumferential wall, and these deep slots open towards one side of the piston stop, at which it snaps into the piston. The piston stop according to the present invention may be easily assembled on the piston, thereby avoiding production of debris caused by contact between the piston stop and the piston and avoiding unfavorable influence on the sealing effect of the sealing member.

BRIEF DESCRIPTION OF DRAWINGS

The present invention is described in detail with reference to figures. Among the figures.

DETAILED DESCRIPTION OF PREFERRED EMBODIMENTS

Figure 1:
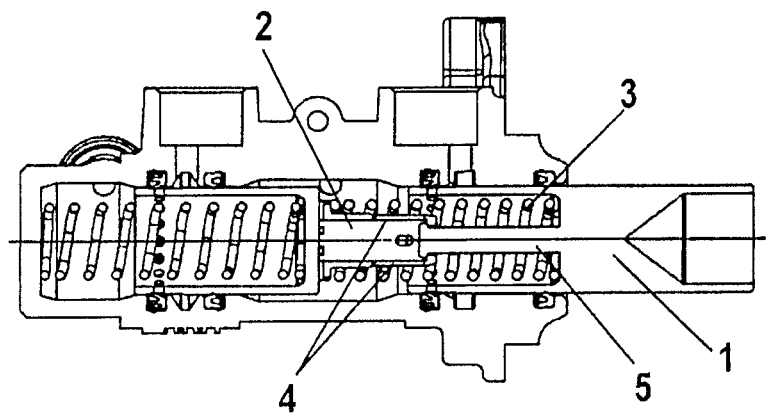
FIG. 1 shows a master cylinder assembly in a brake system according to an embodiment of the present invention.

As shown in FIG. 1, a master cylinder assembly is a double-piston master cylinder assembly, and it comprises two piston assemblies which are arranged in different manners. One of the two piston assemblies comprise a piston 1, a piston stop 2 snapping into the piston 1, and a spring 3 acting between the piston 1 and the piston stop 2. The spring 3 is compressed and retained between the piston 1 and the piston stop 2, and encapsulated outside the piston stop 2. An end of the piston stop 2 away from the piston 1 fixedly abuts against an end of a piston of another piston assembly. On a circumferential wall of the piston stop 2 are provided a plurality of deep slots 4 extending axially and running through the thickness of the circumferential wall, and these deep slots 4 open towards one side of the piston stop where it snaps into the piston.

FIG. 1 shows a master cylinder assembly in a brake system according to an exemplary embodiment of the present invention. The present invention is not limited to this. The master cylinder assembly may comprise two piston assemblies with identical structure. For example, each piston assembly has the structure as described above, namely, it comprises a piston, a piston stop and a spring, and the spring of each piston assembly is retained between the piston and the piston stop, and encapsulated outside the piston stop. On a circumferential wall of each piston stop are provided deep slots extending axially and running through the thickness of the circumferential wall. The master cylinder assembly according to the present invention may also have one piston assembly or more piston assemblies in series. An end of the piston stop away from the piston fixedly abuts against a cylinder block of the master cylinder assembly.

Figure 2:
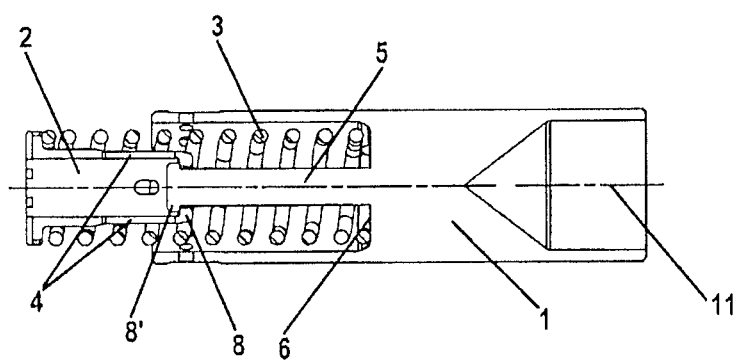
FIG. 2 shows a piston assembly of the master cylinder assembly of FIG. 1.

FIG. 2 shows a piston assembly of the master cylinder assembly in the brake assembly. As can be seen from FIG. 2, a cavity is provided in the piston 1, a pin-shaped protrusion 5 is provided at a center of the cavity and it may snap in the piston stop 2 and is axially moveable after snapping in the piston stop 2, and it acts in cooperation with the piston stop 2. An "R"-shaped lead 8, 8' is provided at an end of the piston stop 2 and the pin-shaped protrusion 5 of the piston 1 where they snap with each other. A flange is provided at an end of the piston stop opposite to the "R"-shaped lead 8. A bottom surface of the cavity of the piston 1 forms an annular flat surface 6, and an annular flat surface 7 is also formed on the flange of the piston stop, an end of the spring 3 is supported on the flat surface 6 of the piston, and the other end thereof is supported on the flat surface 7 of the piston stop.

Figure 3A:
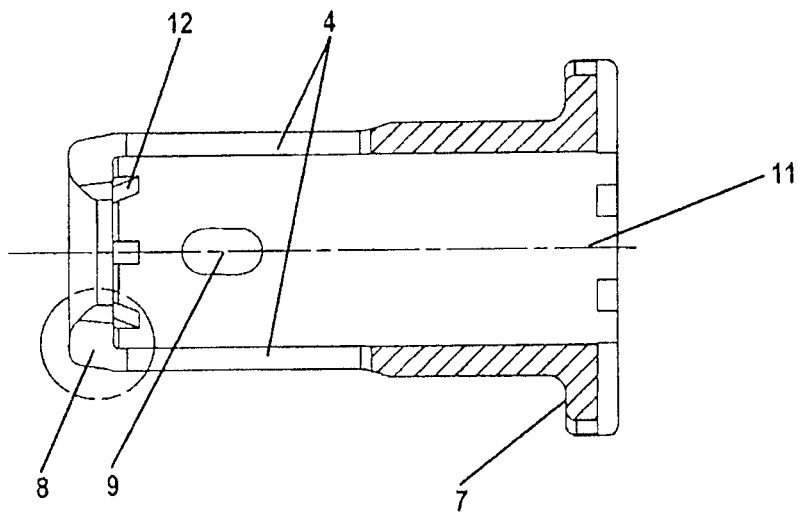
FIG. 3a and FIG. 3b illustrate an embodiment of a piston stop according to the present invention respectively in a cross-sectional view and a front view.
Figure 3B:
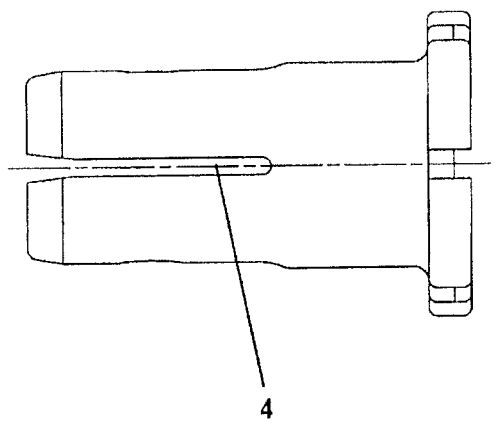

FIG. 3a and FIG. 3b illustrate an embodiment of a piston stop according to the present invention. As shown in FIG. 3a and FIG. 3b, deep slots 4 are axially provided on a circumferential wall of the piston stop 2, and the deep slots are open at an end of the piston stop 2 where the piston stop 2 snaps into piston 1, whereby the piston stop 2 can easily snap into the piston 1. The figures show two deep slots as an example. Certainly, a different number of deep slots may be provided according to needs. Preferably, the deep slots 4 are symmetrically arranged about a central axis 11 of the piston stop. A length of the deep slots 4 in an axial direction may be designed according to needs.

As can be further seen from FIG. 3a, two holes 9 are provided on a circumferential wall of the piston stop and arranged radially opposite to each other. The two holes promote circulation of a brake liquid during braking operation so that the brake fluid circulates to an outlet quickly. Certainly, more holes may be provided according to the needs.

Figure 3C:
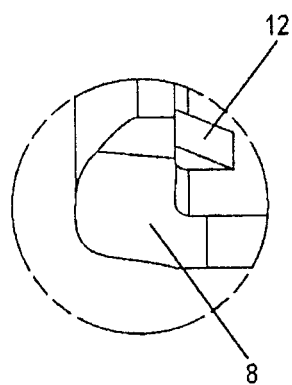
FIG. 3c is a partially enlarged view illustrating an R-shaped lead on the piston stop.

FIG. 3c is a partially enlarged view illustrating an R-shaped lead on the piston stop. By means of the "R"-shaped lead, the piston stop may be simply assembled on the piston, so that an excessive stress would not be produced at a position where the piston stop contacts the piston, and debris is not caused. Likewise, an "R"-shaped lead may also be provided at an end of the pin-shaped protrusion 5 of the piston where the pin-shaped protrusion snaps into the piston stop. As shown in FIG. 3c, reinforcing ribs 12 are provided on a circumferential inner wall of the piston stop closely adjacent to the "R"-shaped lead, axially inside the "R"-shaped lead. The figure exemplarily shows six reinforcing ribs 12 arranged symmetrically about an axis of the piston stop. Certainly, a different number of reinforcing ribs may be provided in other forms according to the needs. The reinforcing ribs 12 may reinforce the strength of the bottom portion of the piston stop, particularly when the piston stop snaps into the piston.

Figure 4:
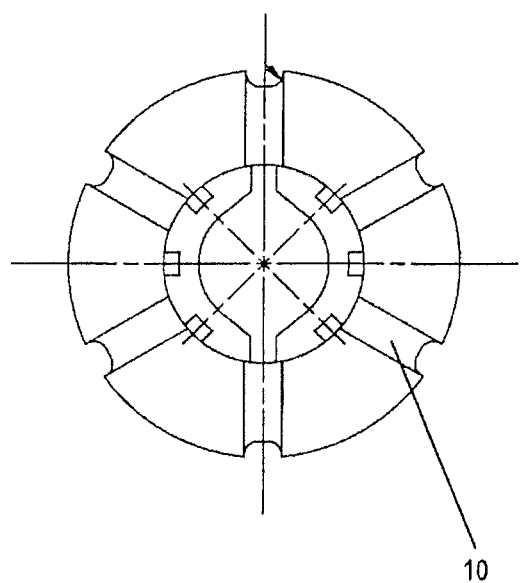
FIG. 4 is a rear view illustrating the piston stop of FIG. 3a to FIG. 3c.

FIG. 4 is a rear view illustrating the piston stop 2. As shown in FIG. 4, on a bottom surface of the flange of the piston stop 2 are provided six radially extending grooves 14 which are symmetrically arranged about a central axis 11 of the piston stop. Like the holes 9 shown in FIG. 3a, these grooves 14 help the brake fluid to circulate to an outlet quickly during the braking and facilitates making a braking response quickly. Certainly, the number of grooves is not limited to six, and a different number of grooves may be provided according to the needs.

The piston stop 2 may be made of plastic, and it is easy to process and can be manufactured with a lower cost.

What is claimed is:

1. A master cylinder assembly in a brake system, comprising:
    one or more piston assemblies,
    at least one of the piston assemblies comprising a piston (1), a piston stop (2) and a spring (3),
    wherein the piston stop (2) snaps into the piston (1), and the spring is retained between the piston (1) and the piston stop (2) and placed outside the piston stop (2),
    wherein a circumferential wall of the piston stop (2) is provided with deep slots (4) extending axially and running through the thickness of the circumferential wall, and the deep slots open towards one side of the piston stop (2) where the piston stop snaps into the piston (1),
    an "R"-shaped lead (8) provided at an end of the piston stop (2) where the piston stop snaps into the piston (1), and
    reinforcing ribs (12) axially provided on a circumferential inner wall of the piston stop (2) and disposed closely adjacent to the "R"-shaped lead (8) of the piston stop (2).

2. The master cylinder assembly according to claim 1, wherein holes (9) are provided on a circumferential wall of the piston stop (2).

3. The master cylinder assembly according to claim 1 further comprising a flange provided at an end of the piston stop (2) away from the piston (1), and radially extending grooves (10) provided on a bottom surface of the flange.

4. The master cylinder assembly according to claim 3, wherein a flat surface (7) is provided on the flange of the piston stop (2) for supporting the spring (3).

5. The master cylinder assembly according to claim 1, further comprising a cavity provided in the piston (1), a pin-shaped protrusion (5) provided at a center of the cavity and snapped into the piston stop (2) for cooperating with the piston stop (2).

6. The master cylinder assembly according to claim 5, further comprising an "R"-shaped lead (8) provided at an end of the pin-shaped protrusion (5) where the pin-shaped protrusion snaps into the piston stop (2).

7. The master cylinder assembly according to claim 1, wherein a flat surface (6) is provided on the piston (1) for supporting one end of the spring (3).

8. The master cylinder assembly according to claim 5, further comprising a bottom portion of a cavity provided as a flat surface (6) for supporting one end of the spring (3).

9. The master cylinder assembly according to claim 1, wherein the deep slots (4) are symmetrically arranged about an axis of the piston stop.

10. A piston stop (2) of a master cylinder assembly in a brake system, the master cylinder assembly comprising:
    one or more piston assemblies,
    at least one of the piston assemblies comprising a piston (1), a piston stop (2) and a spring (3),
    wherein the piston stop (2) snaps into the piston (1) of the master cylinder assembly,
    deep slots (4) provided on a circumferential wall of the piston stop (2) and extending axially and running through the thickness of the circumferential wall, the deep slots open towards one side of the piston stop (2) where the pistons stop snaps into the piston (1),
    an "R"-shaped lead (8) provided at an end of the piston stop (2) where the pistons stop snaps into the piston (1), and
    reinforcing ribs (12) axially provided on a circumferential inner wall of the piston stop (2) and disposed closely adjacent to the "R"-shaped lead (8) of the piston stop (2).

11. The piston stop (2) according to claim 10, further comprising holes (9) provided on a circumferential wall of the piston stop (2).

12. The piston stop (2) according to claim 10 or 11, further comprising a flange provided at an end of the piston stop (2) away from the piston (1), and radially extending grooves (10) provided on a bottom surface of the flange.

13. The piston stop (2) according to claim 12, wherein a flat surface (7) is provided on the flange of the piston stop (2) for supporting the spring (3).

14. The piston stop (2) according to claim 10, wherein the deep slots (4) are symmetrically arranged about an axis of the piston stop.

* * * * *